United States Patent [19]

Brisk et al.

[11] 4,115,859
[45] Sep. 19, 1978

[54] BACK GAUGE CONTROLLER

[75] Inventors: Richard A. Brisk, Wayland; David E. Miller, Beverly, both of Mass.

[73] Assignee: Dynamics Research Corporation, Wilmington, Mass.

[21] Appl. No.: 811,908

[22] Filed: Jun. 30, 1977

[51] Int. Cl.² .................. G06F 15/46; B21D 5/00
[52] U.S. Cl. ........................ 364/476; 364/104; 364/107
[58] Field of Search ............... 235/151.11, 151.1; 364/900, 200, 107, 104, 475, 476; 72/8, 36

[56] References Cited

U.S. PATENT DOCUMENTS

| | | | |
|---|---|---|---|
| 3,618,349 | 11/1971 | Roch | 72/36 |
| 3,821,525 | 6/1974 | Eaton et al. | 235/151.1 |
| 3,874,205 | 4/1975 | Roch et al. | 72/8 |
| 3,922,671 | 11/1975 | Tripp | 235/151.11 |
| 4,034,354 | 7/1977 | Simmons | 364/104 |
| 4,038,533 | 7/1977 | Dummermuth et al. | 364/107 |

Primary Examiner—Felix D. Gruber
Attorney, Agent, or Firm—Weingarten, Maxham & Schurgin

[57] ABSTRACT

A programmable digital controller adapted for driving a back gauge operating in conjunction with a press brake. Via a front panel keyboard, an operator enters dimension, step, cycle, bend allowance, and depth parameters designating one or more bends in a sequence of bends to be formed by the press brake. The controller is capable of storing a plurality of bend sequences in addition to the sequence currently being performed. Sequences can be modified by an operator and edited by means of controller keyboard switches and front panel displays.

22 Claims, 11 Drawing Figures

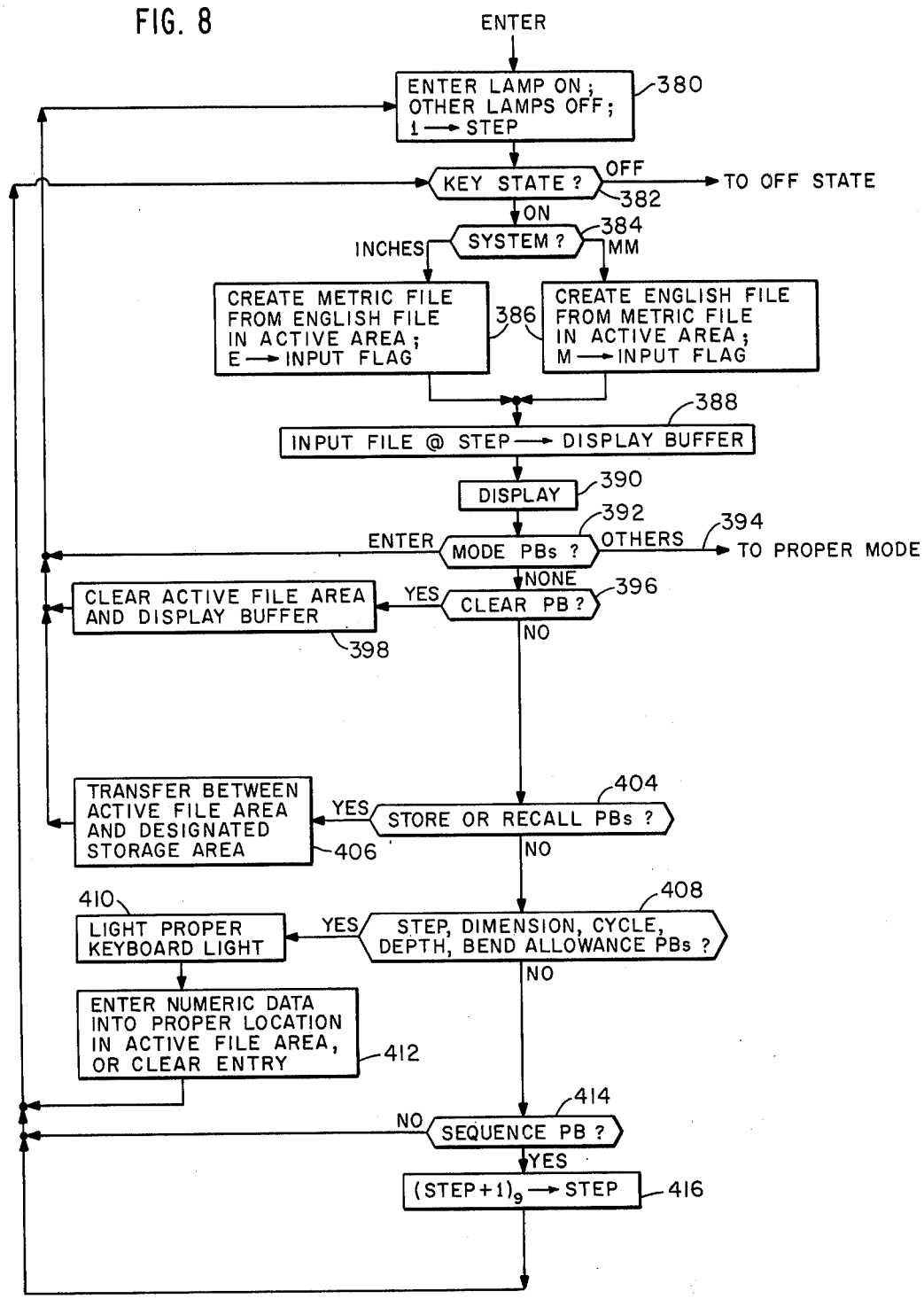

BACK GAUGE CONTROLLER

FIELD OF THE INVENTION

This invention relates to gauging systems and more particularly to controllers for use with press brake back gauges.

BACKGROUND OF THE INVENTION

Gauging systems for press brakes and other sheet forming and cutting apparatus are well known and generally comprise a gauge bar or other element adjustably positioned as a reference against which a sheet is butted for appropriate location prior to bending, cutting, or other formation. In a press brake for forming bends in sheet metal, the gauging system, known in the art as a back gauge (or front gauge depending on its position), is disposed behind the press brake to serve as an adjustable stop against which sheet stock, introduced from the front of the press between the forming dies, is butted to position the sheet for an intended bend. One such back gauge suitable for use with the present invention is shown in copending United States patent application Ser. Nos. 715,539, filed Aug. 18, 1976, and now U.S. Pat. No. 4,089,200 and 718,815, filed Aug. 30, 1976, and now U.S. Pat. No. 4,055,070 assigned to the assignee of the present invention. It is desirable to be able to easily and accurately reposition the gauge in a predetermined sequence to allow rapid and accurate forming of the metal work-piece.

The automatic control of press brakes and other forming machinery has become realizable for even relatively small machines by the development of reliable and economical electronics employing readily programmed digital processors. It is the object of this invention to provide a back gauge controller especially adapted for use in an automatically controlled press brake system. While the invention is described in relation to a preferred embodiment for use with a press brake and associated back gauge, it is contemplated that the invention is more broadly useful with a variety of sheet forming and cutting machines.

SUMMARY OF THE INVENTION

In brief, the present invention provides a back gauge controller especially adapted for use with a press brake back gauge to result in an automatically controlled system. An operator enters parameters describing a desired sequence of bends to be performed by the press brake by means of a front panel keyboard on the controller. After initial entry, the sequence of bends may be verified and corrected by the operator using the keyboard and displays. A plurality of other bending sequences may be stored by the controller in addition to the bending sequence currently controlling the press brake operation. The controller includes procedures for calibrating the back gauge and also for preventing an operator from selecting erroneous modes of operation.

DESCRIPTION OF THE DRAWINGS

The invention will become more clear in the following detailed description of the preferred embodiment taken in conjunction with the accompanying drawings, of which:

FIG. 8 is a flow diagram showing the procedures carried out by the controller in enter mode;

DESCRIPTION OF THE PREFERRED EMBODIMENT

The present invention comprises an electronic controller for use with a gauging system and is particularly adapted for use with a back gauge operating in conjunction with a press brake. In operation, the press brake operator would first enter into the controller parameters representative of a series of bends which the press brake is to make. In response to this data, the back gauge is controlled to move to the proper positions to allow bends to be made by the press brake at the desired locations in a sheet of metal. As each bend is made by the press brake, the back gauge automatically moves to the next position.

Figure 1:
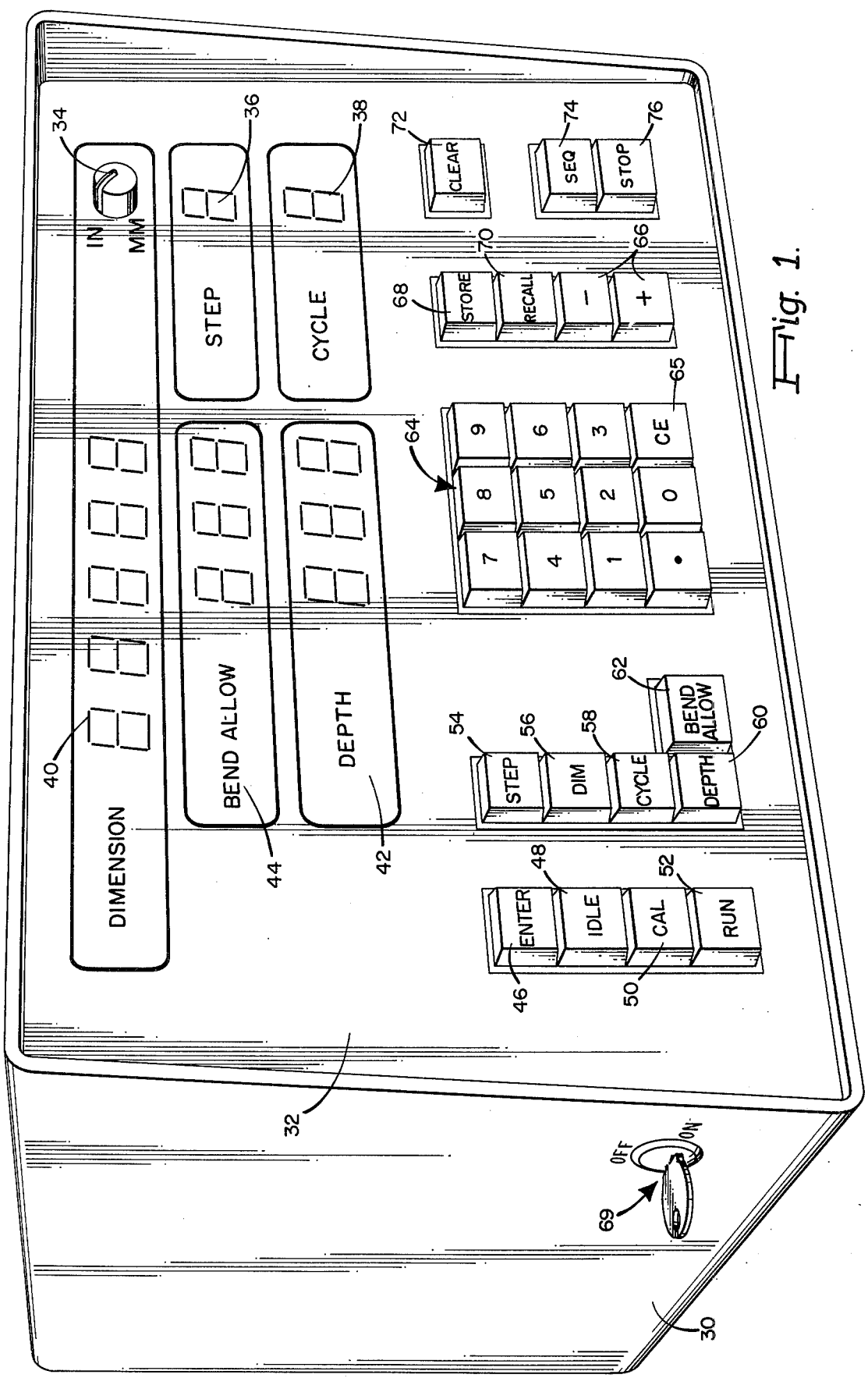
FIG. 1 shows the front panel controls and displays of the controller as they would appear to an operator.

FIG. 1 shows the controller as it would appear to an operator, including the displays and front panel controls. The function of each of these controls, which is briefly described with reference to FIG. 1, will become more clear as the detailed operation of the controller is described below.

The controller is contained within a chassis 30 having a front panel portion 32 upon which are located the controls and displays of the controller. A switch 34 allows the operator to select whether dimensions are to be entered into and displayed by the controller in English or metric units. Five different displays provide information on the sequence of bends which the press brake is to perform. Display 36 labelled "STEP" designates which step in the sequence is being performed. Display 38 labelled "CYCLE" indicates the number of times that step is to be performed before proceeding to the next step. A five-digit display 40 labelled "DIMENSION" indicates the position to which the back gauge is to move during that step. Display 42 labelled "DEPTH" indicates the depth to which the press brake ram is to travel when it is activated during that step and display 44 labelled "BEND ALLOW" indicates the radius to be allowed for the bends, which is determined by the thickness of the workpiece material.

Four pushbutton switches, "ENTER" 46, "IDLE" 48, "CAL" 50, and "RUN" 52, allow the operator to select which mode the controller is to enter. Five pushbutton switches, "STEP" 54, "DIM" 56, "CYCLES" 58, "DEPTH" 60, and "BEND ALLOW" 62, corresponding with the front panel displays 36–44 are used by the operator in entering the information which specifies the particular sequence of steps which the controller is to perform. In the embodiment described herein, the depth parameter stored for each step is only displayed to remind an operator of the depth to which the press brake ram must go to make the desired bend. A numerical keyboard 64 and "PLUS" and "MINUS" pushbutton switches 66 are used in conjunction with buttons 54–62 in entering the desired parameters. "STORE" pushbutton switch 68 and "RECALL" pushbutton switch 70 allow a particular sequence of steps to be stored for later use and recalled when desired, thus allowing the controller to provide quick access to any of several sequences of steps. A "CLEAR" pushbutton switch 72 enables the operator to clear all the steps of a particular sequence, and a "SEQUENCE" pushbutton switch 74 allows an operator to sequentially review and/or perform the steps currently stored in memory by the controller. A STOP button 76 is used for stopping the motion of the back gauge table in cases where an emergency stop is desired. A key switch 69 is used to turn the controller on and off.

The function of these displays and controls will become more clear with reference to the following drawings which explain in detail the operation of the present invention.

Figure 2:
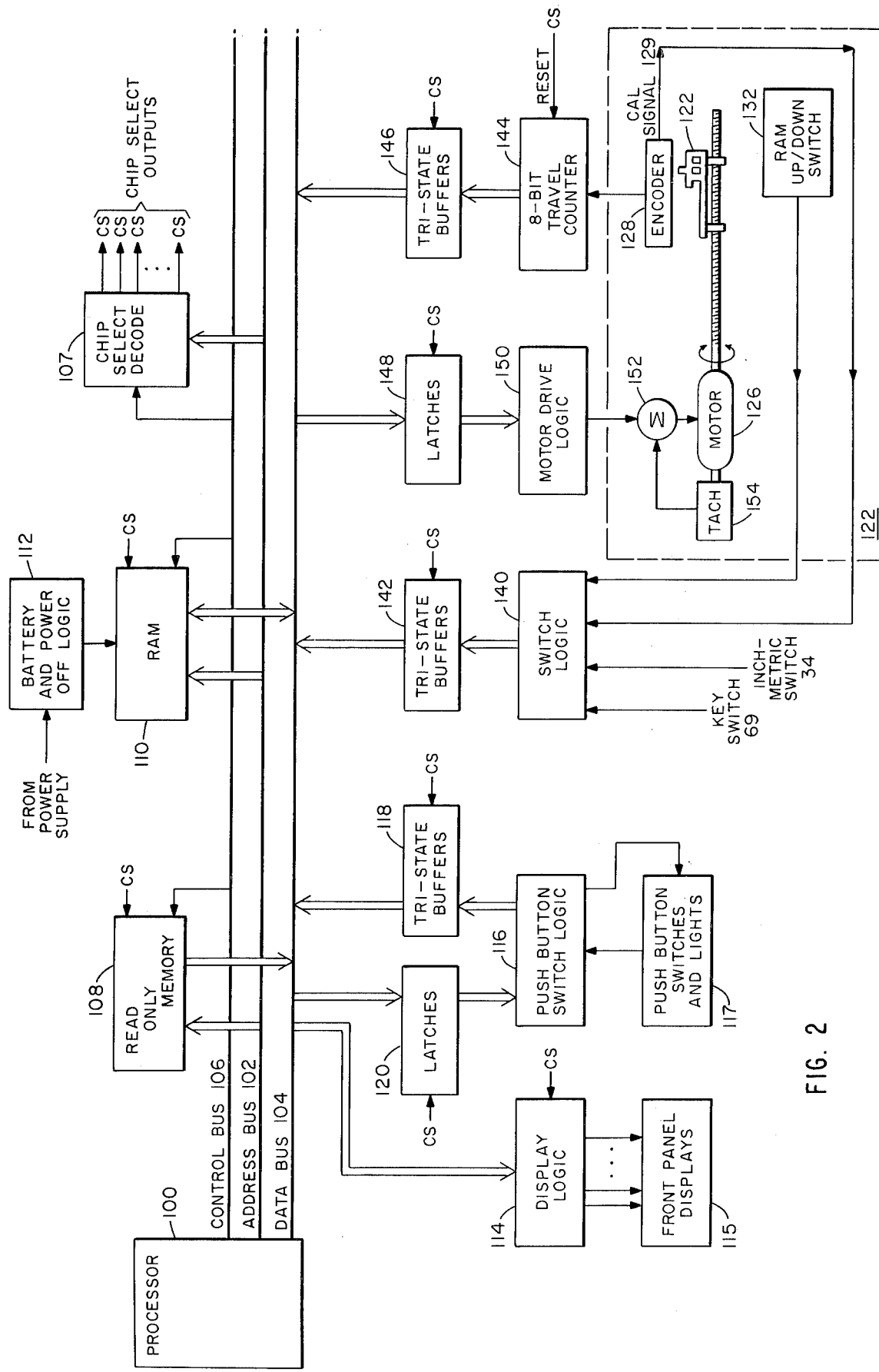
FIG. 2 is a schematic diagram showing the circuitry of the present invention.

FIG. 2 is a block diagram showing the electronic circuitry of the controller in conjunction with the drive and readout mechanisms of the back gauge. Central to the operation of the controller is processor 100. The functions of processor 100 may be performed by many different types of digital data processing equipment, including multi-computers and microprocessors. Many microprocessors which may be used in implementing the invention are commercially available, and the general principles associated with the implementation and operation of these microprocessors are well known. One microprocessor suitable for use with the present invention is the Intel 8080 8-bit microprocessor. This microprocessor is used in the preferred embodiment of the invention described below. This microprocessor is well known and widely available, and extensive documentation of its structure and operation has been published. For this reason, the detailed operation and structure of processor 100 need not be further elaborated hereinbelow. Other digital processors or microprocessors may be suitable for use with the present invention, and the implementation of the present invention with a processor other than that described will be readily apparent to one of ordinary skill in the art. Accordingly, the description of a particular microprocessor in connection with the preferred embodiment is not to be construed as a limitation upon the invention.

Processor 100 communicates with the remainder of the system and controls the back gauge and controller functions by means of three buses: address bus 102, data bus 104, and control bus 106. Address bus 102 is typically a 16-bit parallel digital bus to which is applied data indicative of an address or device to be accessed by or communicated with processor 100. Data bus 104 is typically an 8-bit bidirectional bus on which data is both input to and output from processor 100. Control bus 106, in the preferred embodiment described herein, contains a read/write line indicating whether the processor is reading data from or applying data to bus 104, a clock line, and other timing and control signals necessary for the proper operation of the system.

Four bits from address bus 102 are applied to a chip select decoder 107 which, in conjunction with control signals from control bus 106, produces a plurality of peripheral device and chip select (CS) outputs. Only one of these CS outputs may be active at any one time, and these outputs are used to enable the proper integrated circuit of the controller memory or the proper latches and buffers which are used to interface the remaining parts of the system to data bus 104 and processor 100.

Coded information representative of the operations to be carried out by the controller in performing its various functions is stored in a read-only memory (ROM) 108. The organization of ROM 108 is described in greater detail below. The desired location in ROM 108 is designated by the lower ten bits of address bus 102, which are applied directly to each of the integrated circuits of ROM 108, and by the proper chip select output from chip select decoder 107. Upon application of the proper address information during a read cycle by processor 100, as determined by control signals from control bus 106, the data stored in the designated location in ROM 108 is applied to data bus 104. ROM 108 typically has internal tri-state outputs so that further buffering between the memory circuitry and data bus 104 is not necessary. In the preferred embodiment, ROM 108 includes three integrated circuits each with a memory capacity of 1K words of eight bits each making a total of 3K words of memory.

Temporary storage is provided by a random access memory 110. The proper location in random access memory 110 is designated by processor 100 by the lower eight bits of address bus 102, which are applied directly to the integrated circuits forming random access memory 110. A chip select output from chip select decoder 107 enables random access memory 110. Data is stored in and read from random access memory 110 by means of data bus 104. Random access memory 110 usually has buffered outputs which are properly enabled by the read/write signal from control bus 106 so that no other buffering is necessary between the integrated circuits composing random access memory 110 and data bus 104. Random access memory 110 typically contains 512 words of memory.

Much important data, including up to ten separate blocks defining separate sequences of bending steps, are stored in random access memory 110; and great inconvenience would be caused by loss of this information. Accordingly, the power applied to random access memory 110 is backed up by a battery. Power-off logic 112 ensures that power is always available and applied to random access memory 110, even in the event of a power outage or disconnection of the controller from the AC lines.

The various front panel displays are controlled by display logic 114. As is described in greater detail below, processor 100 sequentially activates each of the digits composing the information displayed on the controller front panel.

These individual digits are repeatedly displayed at a high rate so that the front panel display appears to be continuous. Data representative of the digit to be displayed and the value of that digit are applied through data bus 104 to display logic 114, which is enabled by the proper CS output from chip select decoder 107. Display logic 114 decodes the data from data bus 104 and causes the desired value to be displayed by the proper digit on the front panel of the controller. This process is repeated by processor 100 for each digit of the front panel display.

The operator interacts with the controller by means of the pushbutton switches on the controller front panel. Signals from these pushbutton switches are applied to pushbutton switch logic 116 which encodes the signals produced by the pressing of a front panel switch into an 8-bit parallel word which may be applied to data bus 104. Periodically, processor 100 checks pushbutton switch logic 116 to determine if any front panel pushbuttons have been pressed. At this time, processor 100 causes the appropriate address information to be present on address bus 102, which information is decoded by chip select decoder 107 to produce a chip select output. The data from pushbutton switch logic 116, indicative of which pushbutton has been pressed, is applied to data bus 104 through tri-state buffers 118. At the proper time, the proper chip select output enables tri-state buffers 118, and the data from pushbutton switch logic 116 is applied to data bus 104 and is read by processor 100.

As described in detail below, the operator is kept informed of the status of the controller by means of lights behind certain of the front panel pushbutton switch key tops. These lights are activated by signals which are applied to data bus 104 by processor 100 and clocked into latches 120 by the appropriate chip select signal. The data held in latches 120 is buffered in pushbutton switch logic 116 and lights the proper front panel lights.

Shown within dotted box 112 are the mechanics and drive motor associated with the back gauge and press brake to which the controller is connected. A back gauge table 122 is driven back and forth along a one-dimensional axis by means of a Roh-lix drive 124. Motor 126 actuates Roh-lix drive 124 in response to commands from processor 100, as described below, to move the back gauge table 122 to the desired location. The position of back gauge table 122 is continuously monitored by an optical, linear, incremental encoder 128 which provides data to processor 100 representing the back gauge position. Upon movement of the back gauge table to a predetermined position, a separate calibration track in encoder 128 provides a calibration signal 129 to provide a positive indication of the back gauge table position for rough calibration, as described below. In the preferred embodiment described herein, this signal is produced when the back gauge table is at the 27 inch location. A switch 132 attached to the press brake ram is activated as the ram is lowered and raised to form bends in the work piece. Switch 132 provides an indication to processor 100 of the press brake ram position.

The calibration signal 129 from encoder 128, press brake ram switch 132, front panel inch/metric switch 34, and key switch 69 are applied to switch logic circuitry 140, which allows this information to be read by processor 100. The output of switch logic 140 is applied to data bus 104 through tri-state buffers 142. Periodically, processor 100 applies the proper address information to address bus 102, causing chip select decoder 107 to produce a chip select signal enabling tri-state buffers 142. Processor 100 then reads the state of each of the switches connected to switch logic 140 from data bus 104.

The output from encoder 128 is applied to an 8-bit up/down counter 144, which will be referred to as the travel counter. Travel counter 144 accumulates pulses from encoder 128 and contains a value representative of the net forward or backward movement of the back gauge table during the interval since to the last reading of travel counter 144. The output of travel counter 144 is applied to data bus 104 via tri-state buffers 146. Periodically, processor 100 causes chip select decoder 107 to enable tri-state buffers 146 applying the information in the travel counter 144 to data bus 104 where it is read by processor 100. This information is then used to update the position of the back gauge table stored by processor 100. Immediately after each reading of travel counter 144, processor 100 resets travel counter 144 by means of the appropriate chip select signal, as shown in FIG. 2.

As described in greater detail below, to move the back gauge table to a desired position, processor 100 calculates a digital motor command which is applied to data bus 104 and clocked into latches 148 by the proper chip select signal. The value stored in latches 148 is applied to motor drive logic 150 which decodes the digital data and provides a signal for driving motor 126. In the preferred embodiment, the output of motor drive logic is applied to a summing network 152. The speed of motor 126 is monitored by a tachometer 154, the output of which is also applied to summing network 152. Summing network 152 produces as an output an error signal equal to the difference between the motor drive logic output signal and the tachometer output signal, and this error signal from summing logic 152 is used to drive motor 126.

The operation of the various sections and components shown in FIG. 2 of the back gauge controller, the back gauge, and the press brake, will become more clear as the detailed operation of the back gauge controller is explained below.

Figure 3:
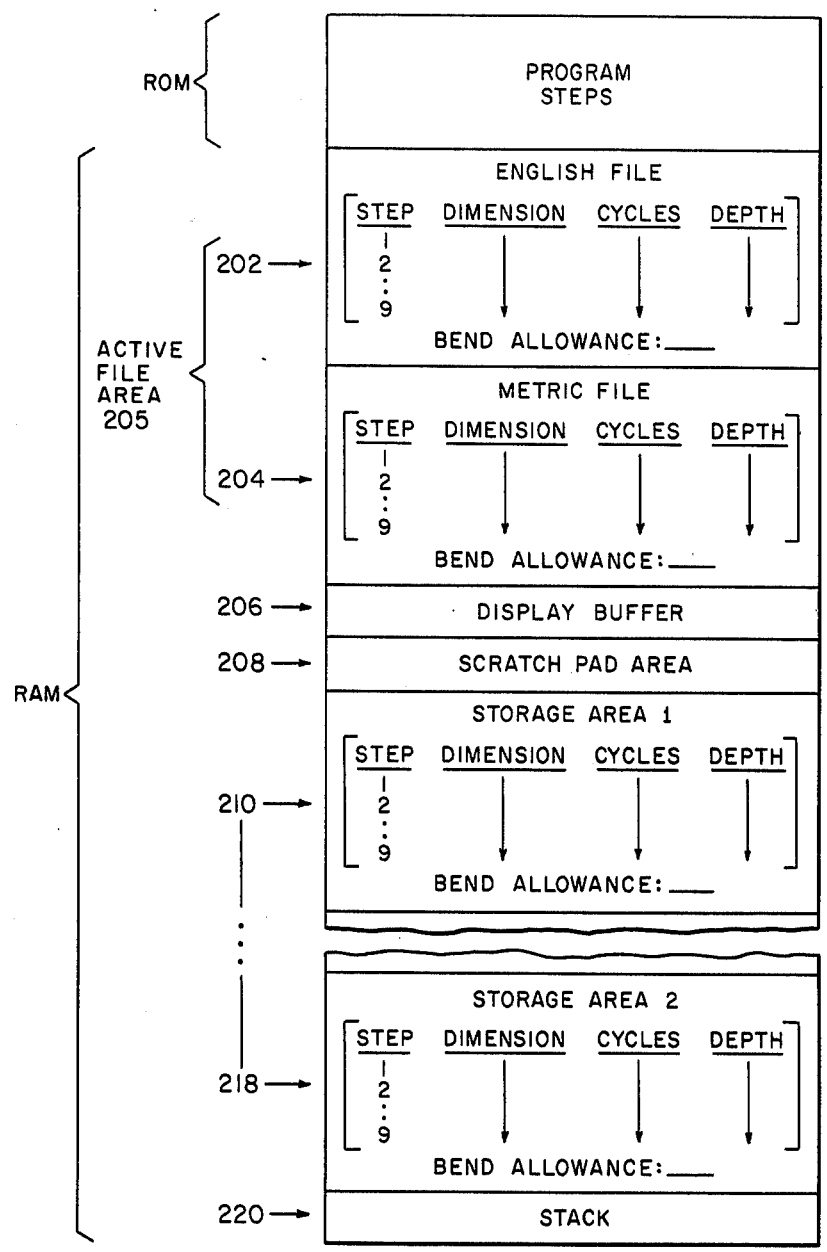
FIG. 3 is a memory map showing the location in memory of various data files kept by the controller.

FIG. 3 shows the organization of memory for processor 100. Located first in memory is the read-only memory 108 of the controller. Read-only memory 108 typically requires approximately 3K 8-bit words and contains the digital instructions which cause processor 100 to perform the proper steps in performing the functions of the back gauge controller. Filed concurrently with the present application is a representative listing of the contents of read-only memory 108 as described hereinbelow. This set of instructions is particularly adapted for use with the above-described Intel 8080 microprocessor.

Following read-only memory 108 is the random access memory 110. Located first in random access memory is ENGLISH FILE 202, requiring approximately forty words of memory. ENGLISH FILE 202 contains the information required to instruct the back gauge to perform and display in inches a complete sequence of bending steps. This includes the dimension of the bend, the number of cycles which the press brake is to perform before the controller proceeds to the next step, and the depth of the press brake ram travel for each step being stored. A bend allowance parameter is stored which is a fixed parameter for all steps and which accounts for the thickness of material being bent by subtracting that thickness from the dimension of the bend. ENGLISH FILE 202 contains each of the above-described parameters in English units.

Following ENGLISH FILE 202 in memory, is METRIC FILE 204. METRIC FILE 204 is identical with ENGLISH FILE 202 described above with the exception that the parameters are stored in metric units rather than English units. METRIC FILE 204 requires approximately forty words of memory.

At all times when the machine is performing or verifying a sequence of steps, both the ENGLISH FILE and the corresponding METRIC FILE are present and stored in their proper places in memory. The formation of these two files and their use will be described in greater detail below. The combination of the ENGLISH and METRIC FILES 202 and 204 makes up the active file area 205.

Following METRIC FILE 204 is display buffer 206. Data to be transferred to the display electronics 113 is stored in display buffer 206 prior to being transferred by processor 100 to the storage registers in the display electronics 113. Display buffer 206 requires approximately eight words of memory.

Following display buffer 206 is scratch pad area 208 in which various index parameters and other variables necessary for the operation of the controller are stored.

Following scratch pad area 208 in memory are nine storage areas 1-9, 210-218. A sequence of steps located in ENGLISH FILE 202 and METRIC FILE 204 and accessible by the controller may be stored by the operator in one of the nine storage areas 1-9, and sequences which are stored in storage areas 1-9 may be recalled by the operator and placed in the active ENGLISH FILE 202 and METRIC FILE 204. The store and recall functions are initiated by the operator pressing front panel store switch 68 or recall switch 70 in conjunction with the proper numeric key on keyboard 64 to identify the desired storage area to which or from which a program is to be stored or recalled. Each of the storage areas 1-9 requires approximately forty words of memory.

Located next in memory is stack 220. Stored in stack 220 are return addresses for sub-routines used by the processor in performing its functions.

Figure 4:
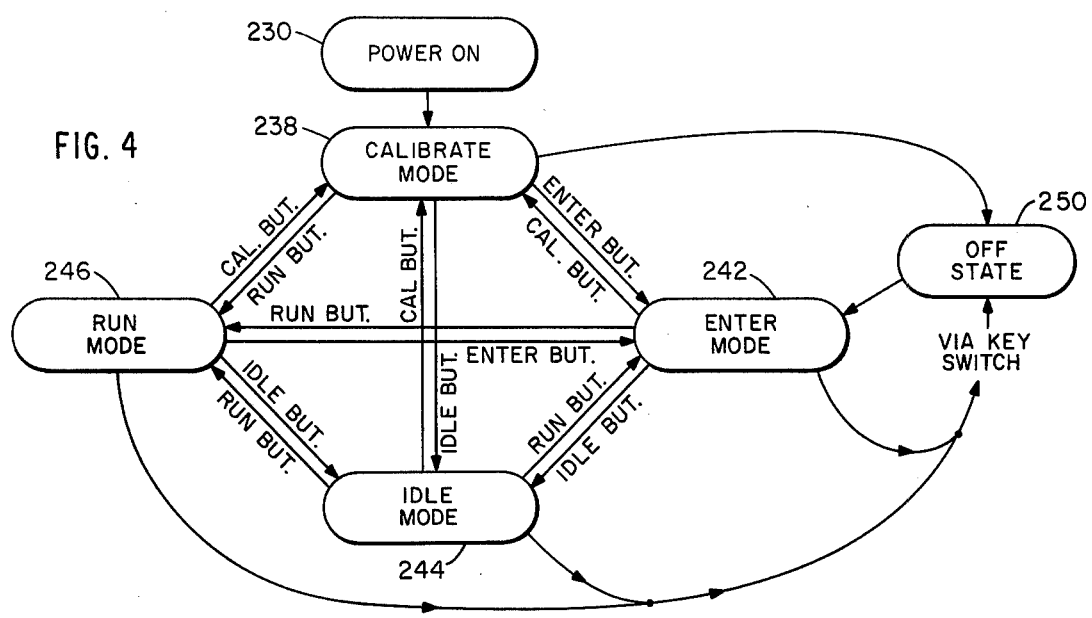
FIG. 4 is a state diagram showing the different states of the controllers and the permitted transitions therebetween.

The detailed operation of the present invention is described below in conjunction with the flow diagrams of FIGS. 5-11. However, before proceeding to this detailed description, a brief summary of the different modes of operation of the back gauge controller may be helpful. FIG. 4 is a state diagram showing each of the different modes in which the controller operates and showing the paths by which the controller is permitted to proceed between these different modes. The steps carried out in performing each of these individual cycles and modes are described in greater detail below with reference to the flow diagrams of FIGS. 5-11. At this time, however, it will be helpful to briefly describe the different modes which the instrument passes through in performing its functions. The interrelation of these different modes will become clear as each is described in greater detail below, and during these detailed descriptions, it may prove helpful to refer back to FIG. 4.

When AC power is first applied to the controller, the processor initializes the necessary parameters and variables, and then waits in power-on mode 230. From power-on mode 230, when the key switch is in the on position, the controller only allows the operator to proceed to calibrate mode 238. The operator begins the calibration routine by pressing the front panel "CALIBRATE" button.

In calibrate mode, the controller first causes the back gauge table to traverse back until the calibration signal 129 is produced by encoder 128. This allows the controller to perform a rough calibration of the back gauge position. Next, the back gauge is returned by the controller to the four-inch position, as indicated by encoder 124. Adjustment of the distance from the back gauge to the die is then performed by the operator by placing a distance gauge block between the press brake and the back gauge and adjusting thumbwheel screws to set a precise distance of four inches between the die in the press brake ram and the back gauge itself. In this manner, small variations in the relationship between the back gauge and the die, which may occur due to the use of different die sets, may be easily and simply eliminated. Once the back gauge has been calibrated, the operator may then select enter, run, or idle modes, described below, by pressing the appropriate front panel buttons 46, 48 or 52. The operator may also re-enter the calibrate mode by pressing the "CALIBRATE" button 50.

During normal operation, the back gauge controller will be in one of three modes: enter mode 242, idle mode 244, or run mode 246. The operator may cause the controller to go from any of these modes to any other by pressing the appropriate front panel button, as shown by paths 248.

In each of the enter and idle modes, the operator may enter, change, or delete steps currently stored in the ENGLISH FILE 202 and METRIC FILE 204 sections of the active file area, in random access memory 110. In enter mode, the operator may also instruct the controller to increment the step register and display the next step currently stored in the active area of random access memory 110 for verification of the sequence. In idle mode 244, the back gauge will sequentially move to the location designated in each step stored in the active area upon repeated actuation of the front panel sequence switch to allow physical verification of the dimension parameters of each step. In run mode 246, the controller will cause the back gauge to sequence through the proper steps and locations as the press brake ram is actuated by the operator to perform the desired bends in the work-piece. If it is desired to recalibrate the back gauge, the operator may return to calibrate mode 238 by pressing the front panel "CALIBRATE" button 50.

The back gauge controller may be turned off by key switch 69 in enter, run, idle, and calibrate modes. Turning the key switch to the off position causes the controller to go from any of these four modes to the off state 250, as shown by path 252.

When the back gauge controller is turned off, power is removed from the front panel controls and displays and from the back gauge drive electronics. Power to the controller electronics is not removed. Even when power is removed from the controller, information stored in the random access memory 110 of the controller is not lost, due to the operation of the battery and power-off logic 112 described above in connection with FIG. 2.

Figure 5:
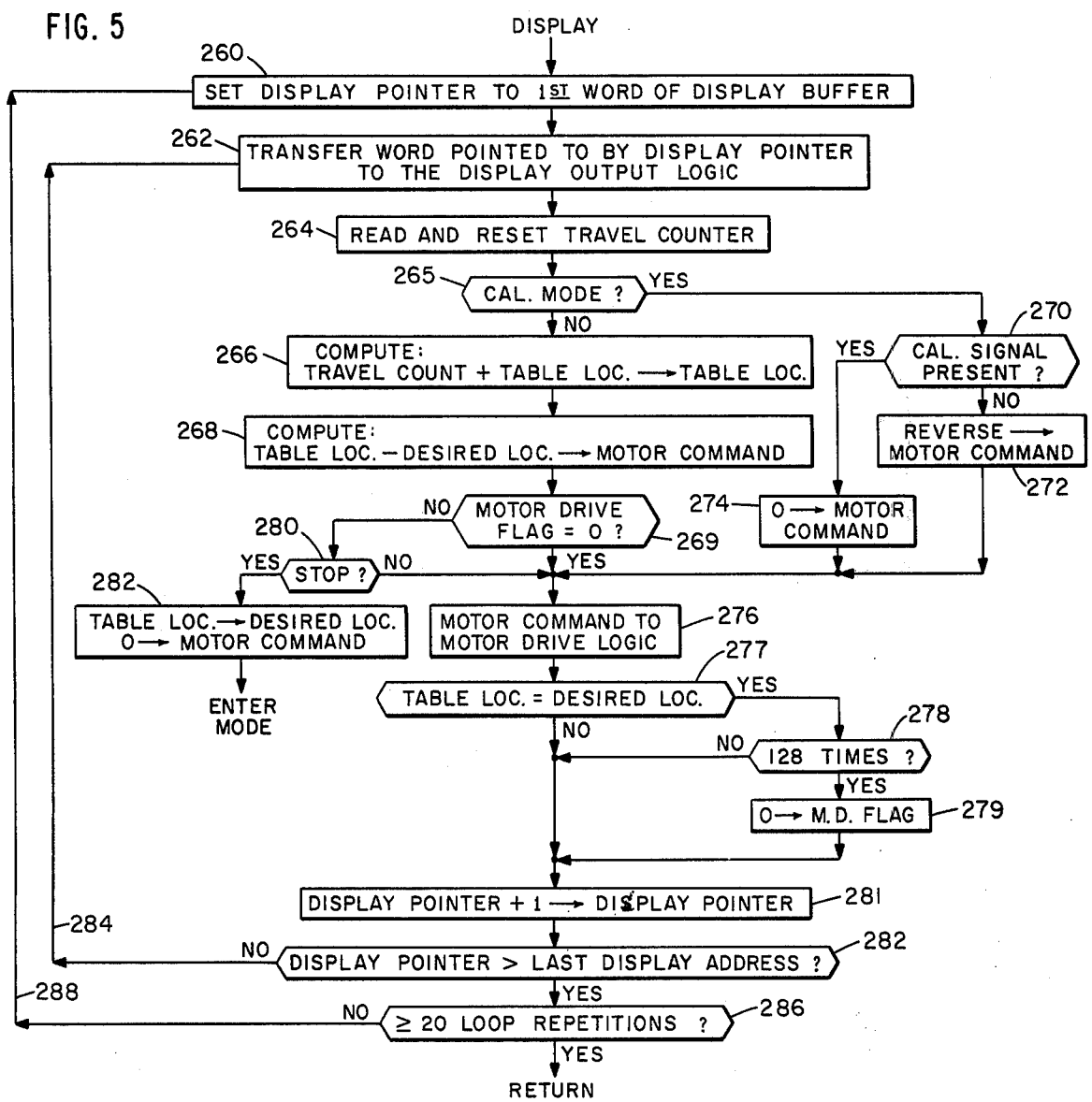
FIG. 5 is a flow diagram showing the procedures carried out by the controller in the display mode.

FIG. 5 shows the display sub-routine, performed by the controller in several of the different modes, which causes the information stored in the display buffer of the random access memory to be displayed on the front panel display and which provides the proper command to the back gauge drive motor 126 to move the back gauge to the proper position and to keep the back gauge at the proper position during operation.

The controller begins the display sub-routine by setting a display pointer index variable to the first word of the display buffer section of memory 206, as shown by block 260. Next, the controller transfers the 8-bit word (containing two BCD digits to be displayed) indicated by the display pointer, to display logic 114 which causes this information to be displayed in the proper display on the controller front panel, block 262.

Next, the controller reads the value accumulated in travel counter 144. This value represents the distance traveled by the back gauge, as indicated by encoder 128, since the last time the travel counter was read.

Immediately after reading travel counter 144, the controller resets the travel counter, block 264.

The controller next determines whether it is in calibrate mode or not, block 265. If the controller is in calibrate mode, it proceeds to block 270 where it checks to determine whether the calibrate signal 129 from encoder 128 is present, block 270. If the calibrate signal 129 is not present, the controller loads the motor command register with a value which causes the motor to move the back gauge table back towards the calibrate position at maximum speed, block 272. Otherwise, if the calibrate signal 129 is present, the controller sets the motor command register to zero, block 274. After carrying out these procedures in calibrate mode, the controller then proceeds to block 276, described below.

If the controller is not in calibrate mode, it possible to block 266 where the present table location is updated by adding the travel count from travel counter 144, previously read by the controller, to the table location stored in the scratch pad area 208 of memory. The processor then calculates the difference between the desired location and the present location to determine the motor command for actuating back gauge motor 126, block 268.

Next, the controller checks the motor drive flag to determine whether it is zero, block 269. When the back gauge table is initially commanded to drive to a new desired location, the motor drive flag is set to 1. When the controller determines that the back gauge table has reached that desired location, as described below, the motor drive flag is reset to zero to provide an indication that the desired location has been reached. Thus, the state of the motor drive flag is indicative of whether the controller is moving the back gauge table to a new desired location or holding it at a fixed location.

If the motor drive flag does not equal zero, indicating that the back gauge table is being moved, the controller proceeds to block 280 where it checks the front panel stop button 76 to determine whether it has been pressed. If front panel stop button 76 has been pressed, the current table location is loaded into the desired location register and zero is sent to the motor command register, block 282. The controller then branches to enter mode, as shown. If the stop button has not been pressed, or if the motor drive flag equals zero, as determined by block 269, the controller proceeds to transfer to motor command to the motor drive logic, block 276.

Next, the controller compares the current table location, previously calculated in block 266, with the desired location, block 277. If the table location equals the desired location, the controller determines whether this condition has been present for the last 128 consecutive executions of the comparison in block 277, block 278. If so, the controller determines that the back gauge table has reached the desired location and resets the motor drive flag to zero, block 279, and then proceeds to block 281. Otherwise, the controller leaves the motor drive flag set and proceeds directly to block 281. The purpose of the test performed in block 278 is to insure that the back gauge table position has stabilized. In moving from one location to another, the back gauge table may overshoot the desired location. If the decision by the controller that the table had reached the desired location was made upon a single comparison of the table location with the desired location, errors in the positioning of the back gauge table would result. The procedure described above insures that the table position has stabilized at the desired location before the motor drive flag is set to zero.

The controller next proceeds to block 281 where the display pointer is incremented by one. The display pointer is checked to determine whether all information in the display buffer has been displayed, block 282; and if not, the controller proceeds via path 284 back to block 262.

If the abovedescribed loop has been performed a sufficient number of times and the display pointer exceeds the last display address, the controller checks to determine how many times the above-described loop 284 has been performed, block 286. If less than 20 repetitions of the loop have been performed, the controller returns via path 288 to block 260 and repeats the entire display mode until 20 loop repetitions have been performed. Performing 1 repetition of the display sub-routine requires approximately 3.2 milliseconds, and repeating this loop 20 times in the above-described manner provides the necessary persistance in the output displayed in the front panel to the operator. If 20 loop repetitions have been performed, as determined by block 286, the controller then returns to the point from which it branched to the display sub-routine.

Normally, power is never removed from the controller. Turning off the controller via the on/off key switch only removes power from the motor drive electronics and the front panel displays and switches. Power is not removed from the encoder 128 or encoder electronics 128, 144, 148, and in off mode 250, the controller will continue to monitor the back gauge table position so that any externally-caused movements of the back gauge table will not affect the calibration of the back gauge. However, even though battery and power-off logic 112 provide power to random access memory 110 when the controller and back gauge are disconnected from the AC line or during power outages, such power outages remove power from the remainder of the controller electronics and the encoder positional readout system. Therefore, upon removal and reapplication of AC power to the back gauge and the controller, the controller requires the operator to carry out the steps of power-on mode 230, and calibrate mode 238 before operation of the back gauge is begun. In this manner, the controller prevents an operator from inadvertently attempting to use the back gauge in an uncalibrated condition.

Figure 7:
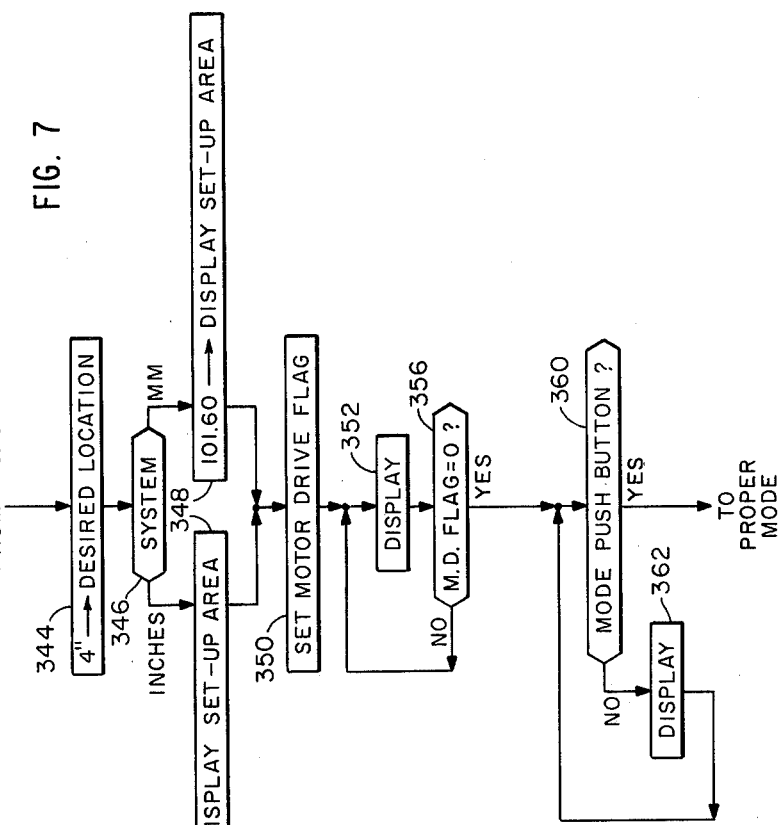
FIGS. 6 and 7 are flow diagrams showing the procedures carried out by the controller in power-on and calibrate modes.
Figure 6:
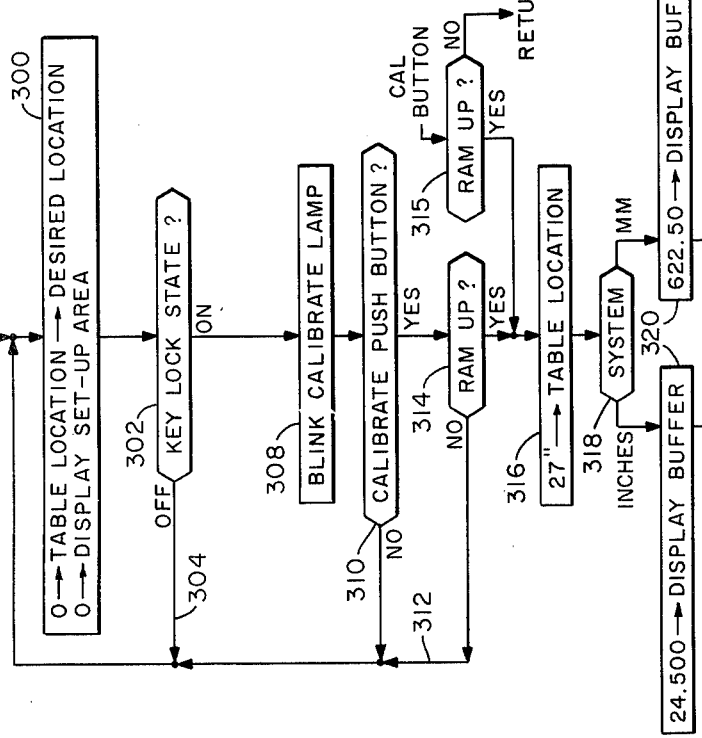

The steps performed by the controller in power-on and calibrate modes are shown in FIGS. 6 and 7. The power-on mode begins when AC power is first applied to the controller. The controller initializes the table location and desired location variables and the display buffer 206 in random access memory 110, block 300. The controller next checks the position of the key switch, block 302. If the switch is in the "OFF" position, the controller returns to block 330 via path 304 and continues in this loop until the key is turned to the "ON" position.

If the key switch is in the "ON" position, the controller will blink a lamp behind front panel calibrate switch 50, block 308. A blinking lamp behind front panel calibrate switch 50 informs the operator that AC power has been removed from the back gauge controller and that a calibration procedure must be carried out. This prevents the operator from trying to operate the machine before it has been calibrated. The controller than checks to determine if front panel calibrate switch 50 has been pressed by the operator, block 310. If not, the controller returns to block 300 via path 312 and repeats the above-described sequence of operation.

If the front panel calibrate switch has been pressed, the controller checks whether the press brake ram is in the up position, block 314. If the press brake ram is in the down position, movement of the back gauge table may cause interference with the press brake ram. In this case, the controller returns to block 300 until the press brake ram is moved to the up position and the calibrate pushbutton switch is again depressed. The press brake ram position is also checked when the "CALIBRATE" button is pressed to enter calibrate mode from another mode, block 315. If the ram is not in the up position, the controller returns to the previous mode. Otherwise it proceeds to calibrate mode.

Once the "CALIBRATE" pushbutton is pressed with the ram in the up position, the controller loads the dimension 27 inches into the table location register. The controller next checks front panel switch 34 to determine whether the operator has selected English or Metric mode, block 318. The position corresponding with the occurrence of calibration signal 129 is then loaded into display buffer 206 with the appropriate units, 27.000 inches or 685.80 millimeters, blocks 320. Next, the calibrate flag is set, block 321. The controller than jumps to the display sub-routine where the position to which the back gauge table is moving is displayed, and the motor drive is commanded to move the back gauge table back to the calibration location as described above, block 322. Upon returning to the start-up mode from the display sub-routine, the controller checks to determine if the motor drive flag has been reset to zero, block 324. If not, the controller continues to branch back to the display sub-routine in block 322 until the calibration signal 129 is detected by the display sub-routine and the motor drive flag is reset to zero.

Next, the controller loads four inches into the desired location, block 344. The controller next checks front panel switch 34 to determine whether the controller is in English or Metric mode, block 346. The calibration table location, 4.000 inches or 101.60 millimeters, is loaded into the display buffer, block 348 and the motor drive flag is set, block 350. The controller then branches to the display sub-routine, block 352. Upon returning from the display sub-routine, the controller checks to determine if the motor drive flag has been reset to zero, block 356. If not, the controller returns to the display sub-routine in block 352 and repeats the above-described loop.

When the back gauge table has reached the desired location, the controller checks the front panel mode pushbuttons to determine whether one of the "ENTER," "IDLE," or "RUN" pushbuttons has been pressed by the operator, block 360. If none of these pushbuttons have been pressed, the controller branches to the display sub-routine, block 362, and upon returning from this sub-routine, returns to block 360 where it checks the mode pushbutton again. This loop is continued until the controller detects that the operator has actuated a front panel mode pushbutton switch. It should be noted that the back gauge table will be actively maintained in the 4.000 inch position during this loop by the display sub-routine, as described above. Upon detection by the controller that the operator has pushed a front panel mode pushbutton, the controller proceeds to the appropriate mode.

Referring to FIG. 8, the controller operation during enter mode is now described. The back gauge controller proceeds to enter mode upon actuation by the operator of the front panel "ENTER" pushbutton 46. The controller commences enter mode by activating a lamp behind front panel enter switch 46, and turning off all other front panel lamps; and the step register, which indicates which step in a sequence is being displayed, is set to one, block 380. The controller next checks the key switch, and if the key switch is in other than the "ON" position, the controller branches to the off mode, block 382. Otherwise, the controller checks front panel "English/Metric" switch 34, block 384. While information and data are entered into the controller in either English or Metric units, the controller always creates the identical information in the other set of units from which the information was entered and stores this information in the appropriate English or Metric file in the active area of random access or Metric file in the active area of random access memory. For example, if an operator were to enter information in English units, the controller would store this data in ENGLISH FILE 202 in random access memory and would also convert the English data to Metric units and store the equivalent Metric data in METRIC FILE 204 in random access memory. Thus, the information is always simultaneously available in both English and Metric units, and any operator may choose to display the stored information in either English or Metric by selecting the desired units with front panel switch 34. This is done in blocks 386. Upon input of data by an operator, the controller sets an input flag in scratch pad area 208 of memory indicating which file contains the original data. This file is called the base file.

The controller next takes the information in the currently selected base file, English or Metric, for the current step and transfers this information to the display buffer 206, block 388. Thus, the dimension step cycle, depth, and bend allowance parameters for the current step are loaded into the display buffer in preparation for their display on the controller front panel. The controller than branches to the display sub-routine where this data is displayed on the front panel, block 390. Upon returning from the display sub-routine the controller checks the front panel mode pushbuttons to determine if any of these switches are being pressed, block 392. If the "ENTER" mode pushbutton is pressed, the controller branches back to the beginning of the enter mode routine at block 380. If the "IDLE," "CALIBRATE," or "RUN" pushbuttons are pressed, the controller branches to the appropriate mode, as shown by path 394. Otherwise, the controller proceeds to check the remaining front panel switches.

The controller checks the front panel "CLEAR" pushbutton 72 to see if it is being pressed by the operator, block 396. If the clear pushbutton is pressed, the controller clears all the data in the active file area, both ENGLISH FILE 202 and METRIC FILE 204, and also clears the display buffer. Thus, if an operator wishes to erase the data representing a sequence of bends, currently stored in the controller, he may do so by pressing the front panel clear button 72. After clearing the active file area and display buffer, the controller returns to the beginning of the enter mode at block 380.

The controller next checks the front panel "STORE" and "RECALL" pushbuttons, block 404. If either the "STORE" or "RECALL" pushbuttons are being pressed, the controller then proceeds to block 406 where it waits for a particular storage area to be designated by means of front panel keyboard 64. If the front panel store pushbutton was previously pressed, the controller will then store the data currently in the active file area in the designated storage area 1 through 9, as shown and described above with reference to FIG. 3. Only the base file is stored in the storage area. If the recall pushbutton was previously pressed, the controller will transfer the data in the designated storage area into the active file area, and any information in the active file area will be lost. Nine registers in the scratch pad memory 208 are used by the controller to determine the units of the data in each storage area. Thus, an operator may store up to nine additional blocks of data representing back gauge step sequences of up to nine steps each by entering each sequence of steps into the controller and then storing each sequence in a selected storage area. Each of these sequences may be selectively recalled by the operator for use by the controller in controlling the back gauge at any time. After completing block 398, the controller returns to the beginning of enter mode.

The controller next checks the front panel "STEP," "DIMENSION," "CYCLE," "DEPTH" and "BEND ALLOWANCE" pushbuttons, block 408. If the controller detects that one of these buttons is pressed, it proceeds to block 410 and lights the keyboard light behind the pushbutton pressed, indicating to the operator that the controller is waiting for that data to be entered. The operator then enters numeric value for the parameter previously designated, and this data is stored in the proper location in the active file area, block 412. Alternately the clear entry pushbutton 65 can be pressed to clear the data currently stored for this parameter. The numeric data entered during block 412 may be an absolute dimension or may be entered in terms of an incremental change to the data currently stored. By preceding numeric data with a plus or minus sign via front panel pushbuttons 66, an operator may modify a stored parameter by incrementing or decrementing it by the designated amount. Thus, an operator may enter or modify individual parameters of each step stored in the active file area by pressing the appropriate front panel pushbuttons designating the parameter to be entered following by the numeric data corresponding with the parameter.

If none of the previously described front panel pushbuttons have been actuated by the operator, as determined by the controller in block 408, the controller next checks the front panel sequence pushbutton 74, block 414. If the sequence pushbutton has not been pressed, the controller returns to block 382 and repeats the above-described series of steps, checking each of the designated pushbuttons again to determine if and when one is pressed by the operator. If the sequence pushbutton is pressed, the step register is incremented by one, block 416, and the controller returns to block 382 and repeats the above-described procedure.

Figure 9:
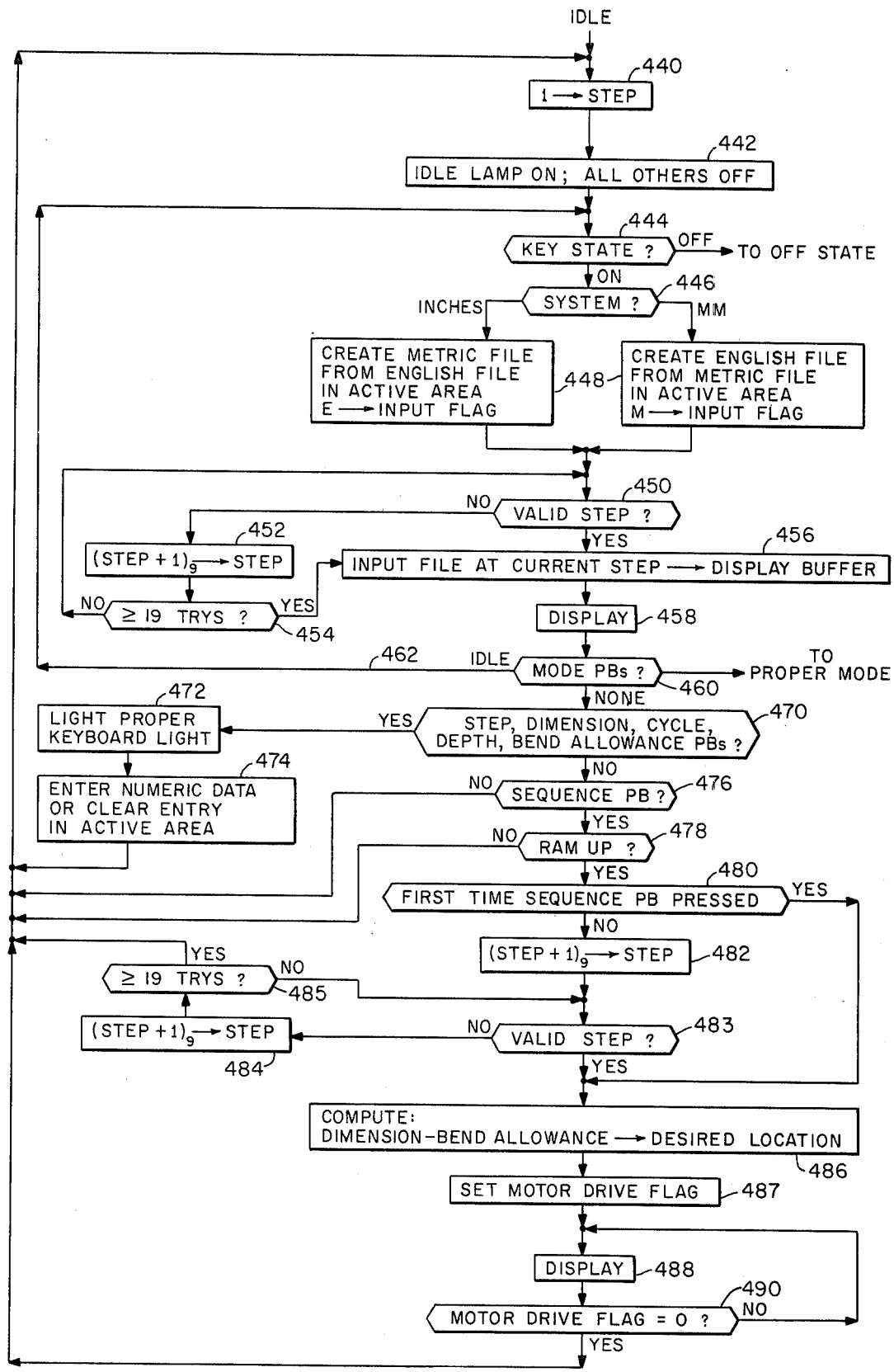
FIG. 9 is a flow diagram showing the procedures carried out by the controller in idle mode.

FIG. 9 shows the steps performed by the controller during idle mode. The controller first sends signals to latches 120 to turn on the idle lamp behind front panel idle switch 48 and to turn all other front panel lights off, block 442. The controller next checks the key switch, block 444. If the key switch is in the "OFF" position, the controller branches to off state 250.

Otherwise, the controller proceeds to check front panel English/Metric switch 34, block 446 and then creates the corresponding English or Metric file from the exisiting Metric or English file in the active area and sets the input flag in scratch pad memory 208 to indicate which file is the base file, block 448.

The controller then proceeds to block 450 where it checks whether the data stored at the current step is valid, that is, whether the current step has a non-zero value for both the dimension and cycles parameters. If the current step is not a valid step, the controller increments the step register, block 452, and checks to determine that the number of consecutive invalid steps has not exceeded nineteen, block 454. The controller then returns to block 450 and attempts to find a valid step. If after nineteen consecutive steps, which corresponds to one more than two complete sequences through the active file, no valid steps are found, the controller branches to block 456 to display the data stored.

If it is determined in block 450 that the current step is a valid step, the input file at the current step is loaded into the display buffer 206, block 456. The controller next branches to the display sub-routine where the information in the display buffer is displayed, block 458.

The controller next checks the front panel mode pushbuttons, block 460. If the front panel "IDLE" pushbutton 48 is pressed, the controller returns to block 444 as shown by path 462. If the "ENTER," "CALIBRAGE," or "RUN" pushbuttons have been pressed, the controller branches to the corresponding mode.

The operator may change the values of individual parameters by pressing the front panel "STEP," "DIMENSION," "CYCLE," "DEPTH," or "BEND ALLOWANCE" pushbuttons, which is detected by the controller in block 470. The controller lights the proper keyboard light, block 472 and then enters the following numeric data into the proper location in the active area, block 474, as described above in the explanation of enter mode with reference to blocks 410 and 412.

If none of the above pushbuttons have been actuated by the operator, the controller next checks the front panel sequence pushbutton 74, block 475. If this pushbutton has not been pressed, the controller returns to block 444 and repeats the above-described sequence of steps until a front panel pushbutton switch is pressed. If the front panel sequence pushbutton is pressed, the controller causes the back gauge table to move to the proper position for the current step, as described below.

First, the controller checks that the press brake ram is up, block 478. If the ram is not up, the controller returns to block 444 without causing the back gauge table to move. Otherwise, the controller proceeds to block 480 where it checks to determine whether this is the first time the "SEQUENCE" pushbutton has been pressed since the controller has entered idle mode, block 480. If this is the first pass, the controller branches to block 486, and the back gauge table is moved to the location specified in step 1. If this is not the first pass, the controller increments the step register, block 482, and searches for the next valid step stored in the active file area, blocks 483–485, as described above in connection with blocks 450–454. If no valid step is found after nineteen attempts, the controller returns to block 444, block 485.

If the current step is a valid step, the controller computes the desired location by subtracting the bend allowance from the dimension, block 486. Next, the motor drive flag is set, block 487. The controller then proceeds to the display sub-routine, where the current parameters are displayed and the back gauge table is moved to the new desired location, block 488. Upon returning from the display sub-routine, the motor drive flag is checked to see if the back gauge table has reached the desired location, block 490. If not, the controller returns to the display sub-routine and repeats blocks 488 and 490 until the desired location is reached. When the back gauge table reaches the desired location, the controller returns to block 444 as shown in FIG. 9. The operator then may enter new parameters or press the front panel sequence button 74 to have the back gauge table move to the next location in the sequence of steps.

Figure 10:
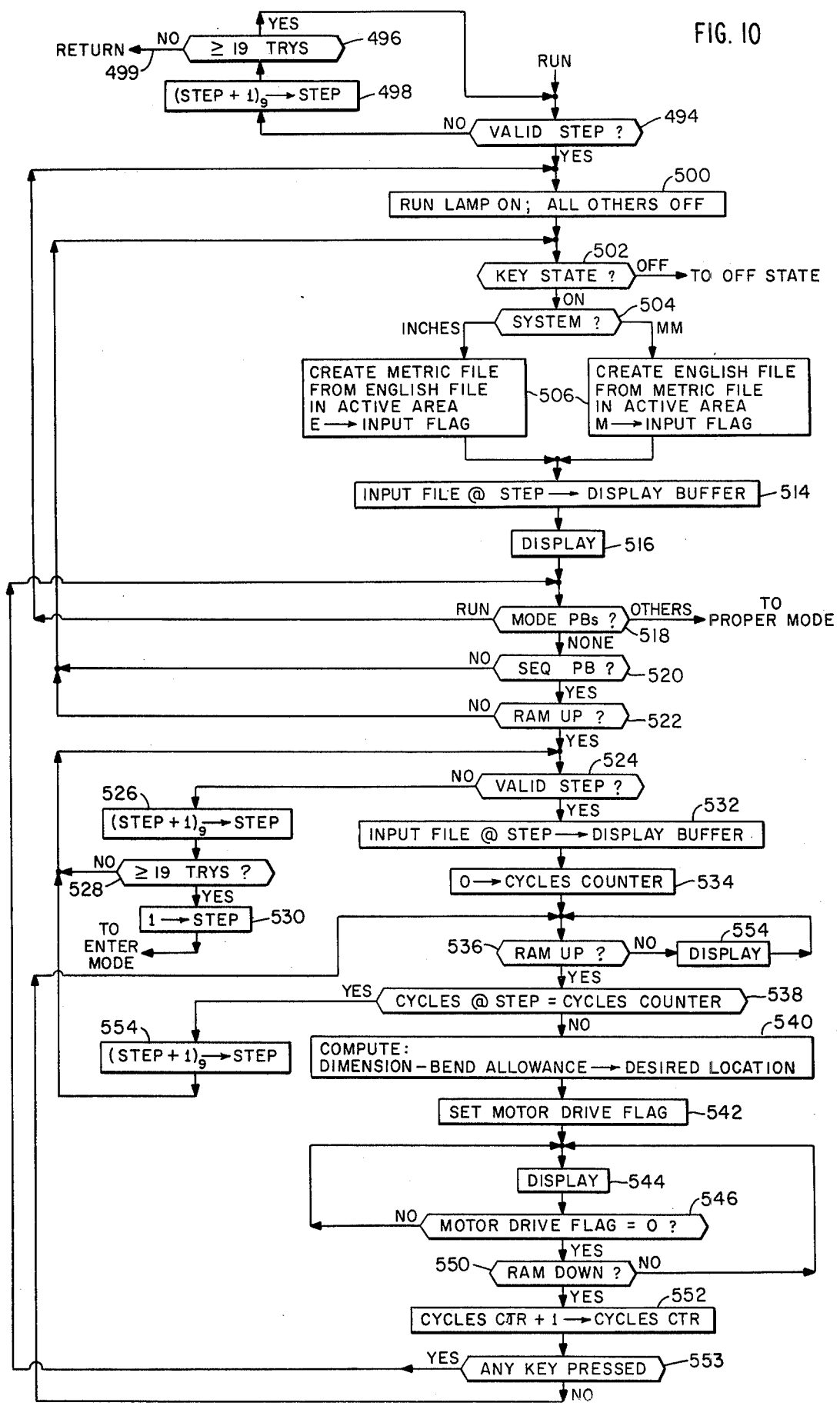
FIG. 10 is a flow diagram showing the procedures carried out by the controller in run mode.

When a desired sequence of steps has been recalled from storage or entered by the operator, and has been verified in the enter and/or idle modes, the operator presses the front panel "RUN" pushbutton 52 to actually perform the bending operations with the press brake, back gauge, and back gauge controller. FIG. 10 shows the steps performed by the controller in run mode.

In response to the operator selecting run mode, the controller first checks to ascertain that at least one valid step is stored in the active file, blocks 494–498. If no valid step exists, the controller will not enter run mode, but will return to the previous mode, as shown by path 499. If a valid step is found, the controller proceeds to block 500 where it activates the run lamp behind the "RUN" pushbutton and turns all other pushbutton lamps off. It should be noted that the step register is not changed when run mode is entered, and thus a bending sequence can be begun, or resumed, at any desired step by selecting that step in the enter or idle modes. Next, the controller checks the position of the key switch, block 502. If the key switch is in the "OFF" position, the controller jumps to off mode. Otherwise, the controller proceeds to check the position of front panel English/Metric switch 34, block 504, and then creates the corresponding English or Metric file from the original Metric or English file in the active area as described in detail above, blocks 506.

The controller next transfers the data at the current step in the active file to the display buffer, block 514, and branches to the display sub-routine where this data is displayed, block 516. The controller then checks the mode pushbuttons, block 518; and if the operator has pressed the "ENTER," "CALIBRATE," or "IDLE" pushbuttons, the controller branches to the corresponding mode. If the operator has pressed the run pushbutton, the controller checks to determine if the sequence pushbutton is pressed, block 520. If not, the controller returns to block 502 and it repeats the above-described loop until the operator goes to another mode by pushing a front panel mode control pushbutton or until the operator begins operation in run mode by pressing the sequence pushbutton.

When the operator wishes to begin operation, he presses the front panel sequence pushbutton 74 which is detected by the controller in block 520. Before beginning operation, the controller checks that the press brake ram is in the up position, block 522. If not, the controller returns to block 502 of run mode and will not proceed past block 522 until the press brake ram is raised and the "SEQUENCE" pushbutton is again pressed.

The controller next checks to determine that the current step is a valid step, block 524, and if not proceeds to cycle through the steps in the active file to find the next valid step, as described above, blocks 526 and 528. If no valid step is found after 19 tries, block 258, the step register is set to 1, block 530, and the controller branches to enter mode.

When a valid step is found in block 524, the controller loads the data at the current step in the selected English or Metric active file into the display buffer, block 532. Next, a cycle counter register, used to count the number of cycles that each step has been performed, is set to zero, block 534.

The controller then proceeds to block 536 where it again checks that the press brake ram is in the up position. (The first time that the controller proceeds to block 536 from block 534, the press brake is always in the up position due to the test in block 522; however, during subsequent branches to block 536, as described below, the press brake ram may be in the down position.) With the ram in the up position, the controller proceeds to block 538 where the number in the cycles counter is compared with the cycles parameter for the current step. If these two values are not equal, as they will not be during the first pass through this block, the controller proceeds to block 540 where the desired location to which the table is to be moved is computed. Next, the motor drive flag is set, block 542, and the controller branches to the display routine where the parameters of the current step are displayed and the back gauge table motor is activated to move the table to the desired location, block 544. The controller continues to branch to the display sub-routine until the motor drive flag is set to zero by the display sub-routine, indicating that the table has reached the desired location, block 546.

After the table has reached the desired location, the controller then checks to determine whether the press brake ram is in the down position, block 550. If not, the controller returns to block 554. The controller will continue to repeat blocks 554 through 550 until the operator lowers the press brake ram to make the desired bend in the workpiece. Once the bend has been made, the controller proceeds to block 552 where the cycles counter register is incremented.

The controller next checks to determine if any front panel pushbutton has been pressed, block 553. If so, the controller branches to block 518, as shown. If a mode pushbutton was pressed, the controller will branch from block 518 to the appropriate mode. Otherwise, the controller will perform the above-described loop of blocks 502–520 until an allowed pushbutton is pressed.

If no front panel key has been pressed, the controller then returns to block 536. Since the ram is in the down position, as determined in block 550, the controller will proceed from block 536 to block 554 where the controller jumps to the display sub-routine. The controller continues to repeat blocks 536 and 554 until the press brake ram is returned to the up position.

When the ram is returned to the up position, the controller goes to block 538, described above. The cycles counter is compared with the cycles parameter of the current step, block 538; and the controller repeats the above-described loop of blocks 536 through 552 until the number of cycles performed is equal to the cycles parameter at the current step. At this point, the step register is incremented, block 554, and the controller returns to block 524 where the procedures of blocks 524 through 552 are repeated for each of the subsequent steps. In this manner, the back gauge controller is stepped through each of the steps in the active file area as the press brake ram is lowered to make the desired bends and raised after each of the bends is made.

Figure 11:
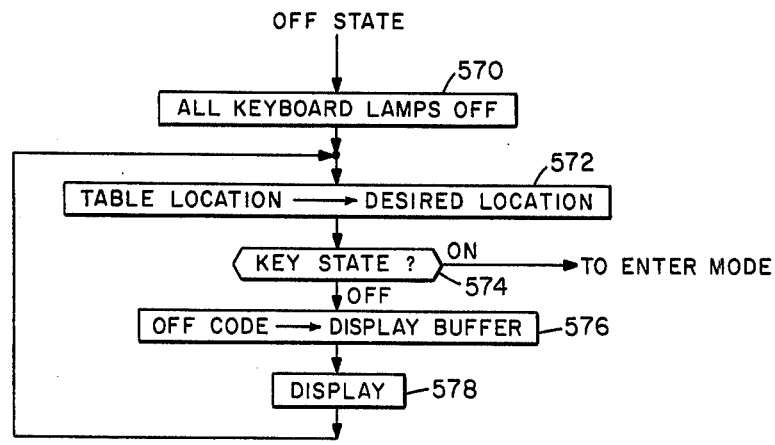
FIG. 11 is a flow diagram showing the procedures carried out by the controller in the off state.

The off state is shown in FIG. 11. As described above, the controller goes into the off state when the key switch is switched to the off positions. During the off state, power is removed from the keyboard lamps and displays and from the motor drive electronics. Power is not removed from encoder 128 and encoder electronics 144, and any movement of the back gauge table which may be caused by external forces is detected and followed by the controller so that recalibration is not necessary.

The controller begins the off state by deactivating all the keyboard lamps, block 570. Next, the current table location is entered into the desired location register, block 572. The controller next checks the position of the key switch, block 553. If the key is in the on position, the controller loads a "display-off" code into the display code into the display setup area, block 576, and then branches to the display sub-routine, block 578. During the display sub-routine, any movement in the table position is monitored by the controller, and the table location register is updated. Since power has been removed from the motor drive electronics, no restoring forces are applied to the table by motor 126. Upon returning from display sub-routine 578, the controller returns to block 574; and the above-described sequence is repeated until the key switch is turned to the on position.

The current location of the table is constantly loaded into the desired location register during the off state so that if the back gauge table is moved by an external force while the controller is off, the table will not "jump" to its original position when the controller is turned on.

There has been described a novel back gauge controller for automatically controlling the position of a back gauge for use with a press brake. It will be appreciated that modifications to the preferred embodiment of the present invention described herein may be made by those of ordinary skill in the art without departing from the intended scope of the invention. Therefore, the invention is to be construed only in accordance with the appended claims and is not to be limited by the above description of a preferred embodiment.

What is claimed is:

1. For use in a gauging system for a forming machine having a forming tool, a gauge bar movable along a travel path toward and away from said forming tool, and an encoder providing a signal indication of the position of the gauge bar along said travel path, a programmable, digital controller comprising:
   a pre-programmed processor having a plurality of stored operating modes;
   a plurality of manually operable mode controls for selecting respective operating modes stored in said processor;
   a plurality of manually operable data select controls for selection of respective gauge parameters;
   keyboard means manually operable for entry of numerical data associated with said data select controls;
   memory means for storing data entered by said data select controls and keyboard means, representing a sequence of steps, each having a plurality of associated gauge parameters;
   said processor including means for sequentially accessing the data represenative of each step of a sequence of steps stored in said memory means;
   means operative in response to signals from said encoder to provide data to said processor representative of the position of said gauge bar along said travel path; and
   drive logic means, operative in response to data from said processor during selected ones of said modes, for causing movement of said gauge bar to an intended position specified by the data representative of the gauge parameters associated with the step presently accessed by said processor;
   the controller further including:
   means operative during a first mode for displaying the gauge parameter associated with each step as said processor sequentially accesses the data representative of each step, without causing said drive logic means to move said gauge bar;
   means operative during a second mode for enabling said drive logic means to move said gauge bar to the intended position associated with each step as the processor sequentially accesses the data representative of each step, without requiring actuation of the forming machine; and
   means operative during a third mode for automatically causing said drive logic means to automatically move said gauge bar, following each actuation of the forming machine, to the intended position associated with each step as the processor sequentially accesses the data representative of each step.

2. The controller of claim 1 wherein the memory means includes means for storing data representative of a plurality of sequences of steps; and
   wherein said processor includes means for selectively accessing the data representative of one of said plurality of sequences of steps.

3. The controller of claim 2 wherein the memory means includes:
   an active file area for storing data representative of one of said plurality of sequences of steps; and
   a plurality of storage areas for storing data representative of the others of said plurality of sequences of steps;
   said means for sequentially accessing being operative to access the data representative of each step of a sequence stored in the active file area;
   and wherein said processor means includes:
   means, operative in response to said data select controls and said keyboard means, for causing the data stored in the active file area to be stored in a selected one of said plurality of storage areas; and
   means, operative in response to said data select controls and said keyboard means, for causing the data stored in a selected one of said plurality of storage areas to be stored in the active file area.

4. The controller of claim 1 wherein said gauging system includes means for adjusting said gauging system to perform calibration of the position of said gauge bar with respect to said forming tool;
   wherein one of said operating modes is a calibrate mode during which said calibration is performed, and one of said mode controls is operative to select the calibrate mode; and
   wherein said processor includes means for preventing operation of the gauging system before calibration of the gauging system has been performed.

5. For use in a gauging system for a forming machine having a forming tool, a gauge bar movable along a travel path toward and away from said forming tool, and an encoder providing a signal indication of the position of the gauge bar along said travel path, a programmable, digital controller comprising:

a pre-programmed processor having a plurality of stored operating modes;

a plurality of manually operable mode controls for selecting respective operating modes stored in said processor;

a plurality of manually operable data select controls for selection of respective gauge parameters;

keyboard means manually operable for entry of numerical data associated with said data select controls;

memory means for storing data entered by said data select controls and keyboard means, representing a sequence of steps, each having a plurality of associated gauge parameters;

said processor including means for sequentially accessing the data representative of each step of a sequence of steps stored in said memory means;

means operative in response to signals from said encoder to provide data to said processor representative of the position of said gauge bar along said travel path;

drive logic means, operative in response to data from said processor during at least one of said modes, for causing movement of said gauge bar to an intended position specified by the data representative of the gauge parameters associated with the step presently accessed by said processor;

wherein the memory means includes means for storing data representative of a plurality of sequences of steps; and wherein said processor includes means for selectively accessing the data representative of one of said plurality of sequences of steps;

said memory means further including:

an active file area for storing data representative of one of said plurality of sequences of steps; and a plurality of storage areas for storing data representative of the others of said plurality of sequences of steps;

said means for sequentially accessing being operative to access the data representative of each step of a sequence stored in the active file area;

and said processor means further including:

means, operative in response to said data select controls and said keyboard means, for causing the data stored in the active file area to be stored in a selected one of said plurality of storage areas; and means, operative in response to said data select controls and said keyboard means, for causing the data stored in a selected one of said plurality of storage areas to be stored in the active file area.

6. The controller of claim 5 further including display means operative in response to signals from said processor for displaying a numerical indication of one or more of said plurality of parameters associated with the presently accessed step.

7. The controller of claim 6 further comprising:

switch means for selecting among English and metric units in which numeric data is entered into said memory means and displayed by said display means.

8. The controller of claim 7 wherein said active file area includes:

an English file portion for storing English unit data representing the parameters of a sequence of steps in English units for each step;

and a metric file portion for storing metric unit data representing the parameters of a sequence of steps in metric units for each step.

9. The controller of claim 8 wherein the processor includes:

means for storing data, entered in one of said English and metric units as selected by said switch means, in the corresponding one of said English and metric file portion of said active file area; and means for transforming the data entered in one of said English and metric units as selected by said switch means into equivalent data in the other one of said English and metric units, and for storing said equivalent data in the corresponding one of said English and metric file portions of the active file area.

10. The controller of claim 9:

wherein the means for causing the data stored in the active file area to be stored in a selected one of said plurality of storage area includes:

means for storing the data from only one of said English and metric file portions of the active file area, as selected by said switch means, so that data is stored in said storage areas in only one of said English and metric units; and wherein said means for causing the data stored in a selected one of said plurality of storage areas to be stored in the active file area includes:

means for causing the data stored in the selected storage area, in one of said English and metric units, to be stored in the corresponding one of said English and metric file portions of said active file area; and means for transforming the data stored in the selected one of said storage areas in one of said English and metric units into equivalent data in the other of said English and metric units and for storing said equivalent data in the corresponding one of said English and metric portions of the active file area.

11. The controller of claim 5 wherein one of said operating modes is a run mode and one of said mode controls is operative to select run mode;

the controller further comprising means for detecting actuation of said forming machine and for producing an actuation signal representative thereof; and wherein said processor means includes means, operative upon selection of run mode and responsive to data from said memory means representative of the presently accessed step parameters and to said actuation signal, for providing data to said drive logic means to cause said gauging bar to automatically move following each actuation of the forming machine to a position specified by said parameters associated with the presently accessed step.

12. The controller of claim 11 wherein one of said operating modes is an enter mode and one of said mode controls is operative to select said enter mode;

wherein said controller further includes display means operative in response to signals from said processor for displaying a numerical indication of one or more of said plurality of parameters associated with the presently accessed step;

wherein said data select controls include controls for selecting a particular one of said parameters and controls for selecting a particular step; and wherein said processor means includes means, operative during enter mode in response to signals from said data select controls and said keyboard means, for entering data representative of a sequence of steps, including:

means for causing data entered by said data select controls and said keyboard means to be stored in said memory means;

means for displaying on said display means the parameters associated with the presently accessed step; and means for selectively altering the data representative of a selected parameter of a selected step stored in said memory means.

13. The controller of claim 12 wherein said processor further includes means for preventing data stored in said memory means from being altered while said processor is in run mode.

14. The controller of claim 12 wherein said gauging system includes means for adjusting said gauging system to perform calibration of the position of said gauge bar with respect to said forming tool;

wherein one of said operating modes is a calibrate mode during which said calibration is performed, and one of said mode controls is operative to select the calibrate mode;

and wherein said processor includes means for preventing operation of the gauging system before calibration of the gauging system has been performed.

15. For use in a gauging system for a forming machine having a forming tool, a gauge bar movable along a travel path toward and away from said forming tool, and an encoder providing a signal indication of the position of the gauge bar along said travel path, a programmable, digital controller comprising:

a pre-programmed processor having a plurality of stored operating modes;

a plurality of manually operable mode controls for selecting respective operating modes stored in said processor;

a plurality of manually operable data select controls for selection of respective gauge parameters;

keyboard means manually operable for entry of numerical data associated with said data select controls;

memory means for storing data entered by said data select controls and keyboard means, representing a sequence of steps, each having a plurality of associated gauge parameters;

said processor including means for sequentially accessing the data representative of each step of a sequence of steps stored in said memory means;

means operative in response to signals from said encoder to provide data to said processor representative of the position of said gauge bar along said travel path; and drive logic means, operative in response to data from said processor during at least one of said modes, for causing movement of said gauge bar to an intended position specified by the data representative of the gauge parameters associated with the step presently accessed by said processor;

wherein said gauging system includes means for adjusting said gauging system to perform calibration of the position of said gauge bar with respect to said forming tool;

wherein one of said operating modes is a calibrate mode during which said calibration is performed, and one of said mode controls is operative to select the calibrate mode; and wherein said processor includes means for preventing operation of the gauging system before calibration of the gauging system has been performed.

16. The controller of claim 15 wherein one of said operating modes is a run mode and one of said mode controls is operative to select run mode;

the controller further comprising means for detecting actuation of said forming machine and for producing an actuation signal representative thereof; and wherein said processor means includes means, operative upon selection of run mode and responsive to data from said memory means representative of the presently accessed step parameters and to said actuation signals, for providing data to said drive logic means to cause said gauging bar to automatically move following each actuation of the forming machine to a position specified by said parameters associated with the presently accessed step.

17. The controller of claim 16 wherein one of said operating modes is an enter mode and one of said mode controls is operative to select said enter mode;

wherein said controller further includes display means operative in response to signals from said processor for displaying a numerical indicaton of one or more of said plurality of parameters associated with the presently accessed step;

wherein said data select controls include controls for selecting a particular one of said parameters and controls for selecting a particular step; and wherein said processor means includes means, operative during enter mode in response to signals from said data select controls and said keyboard means, for entering data representative of a sequence of steps, including:

means for causing data entered by said data select controls and said keyboard means to be stored in said memory means;

means for displaying on said display means the parameters associated with the presently accessed step; and means for selectively altering the data representative of a selected parameter of a selected step stored in said memory means.

18. The controller of claim 16 wherein said processor further includes means for preventing data stored in said memory means from being altered while said processor is in run mode.

19. The controller of claim 15 wherein said means for preventing includes:

means for detecting a loss of calibration of said gauge bar position;

means for preventing any of said operating modes other than said calibrate mode from being selected upon detection of said loss of calibration; and means operative in response to selection of said calibration mode for causing the gauge bar to move to a pedetermined position along said travel path so that said gauging system adjusting means may be operated to calibrate the distance between said gauge bar and forming tool.

20. The controller of claim 19 wherein the means for detecting a loss of calibration includes means for detecting loss of AC power.

21. For use in a gauging syste for a forming machine having a forming tool, a gauge bar movable along a travel path toward and away from said forming tool, and an encoder providing a signal indication of the position of the gauge bar along said travel path, a programmable, digital controller comprising:
- a pre-programmed processor having a plurality of stored operating modes;
- a plurality of manually operable mode controls for selecting respective operating modes stored in said processor;
- a plurality of manually operable data select controls for selection of respective gauge parameters;
- keyboard means manually operable for entry of numerical data associated with said data select controls;
- memory means for storing data entered by said data select controls and keyboard means, representing a sequence of steps, each having a plurality of associated gauge parameters;
- said processor including means for sequentially accessing the data representative of each step of a sequence of steps stored in said memory means;
- means operative in response to signals from said encoder to provide data to said processor representative of the position of said gauge bar along said tragel path; and
- drive logic means, operative in response to data from said processor during at least one of said modes, for causing movement of said gauge bar to an intended position specified by the data representative of the gauge parameters associated with the step presently accessed by said processor;
- wherein one of said operating modes is a run mode and one of said mode controls is operative to select run mode;
- the controller further comprising means for detecting actuation of said forming machine and for producing an actuation signal representative thereof;
- said processor means further including means, operative upon selection of run mode and responsive to data from said memory means representative of the presently accessed step parameters and to said actuation signal, for providng data to said drive logic means to cause said gauging bar to automatically move following each actuation of the forming machine to a position specified by said parameters associated with the presently accessed step;
- wherein one of said operating modes is an enter mode and one of said mode controls is operative to select said enter mode;
- said controller further including display means operative in response to signals from said processor for displaying a numerical indication of one or more of said plurality of parameters associated with the presently accessed step;
- said data select controls including controls for selecting a particular one of said parameters and controls for selecting a particular step; and
- said processor means further including means, operative during enter mode in response to signals from said data select controls and said keyboard means, for entering data representative of a sequence of steps, including:
- means for causing data entered by said data select controls and said keyboard means to be stored in said memory means;
- means for displaying on said display means the parameters associated with the presently accessed step; and
- means for selctively altering the data representative of a selected parameter of a selected step stored in said memory means;
- and wherein said gauging system further includes means for adjusting said gauging system to perform calibration of the position of said gauge bar with respect to said forming tool;
- wherein one of said operating modes is a calibrate mode during which said calibration is performed, and one of said mode controls is operative to select the calibrate mode;
- and wherein said processor includes means for preventing operation of the gauging system before calibration of the gauging system has been performed.

22. The controller of claim 21 wherein one of said operating modes is an idle mode and wherein one of said mode controls is operative to select said idle mode; and
- wherein said processing means includes means operative during idle mode for sequentially accessing the data representative of each step of a sequence of steps stored in said memory means and for providing signals to said drive logic means for causing said gauge bar to move to a position specified by the parameters associated with the presently accessed step.

* * * * *

UNITED STATES PATENT AND TRADEMARK OFFICE
CERTIFICATE OF CORRECTION

PATENT NO. : 4,115,859
DATED : September 19, 1978
INVENTOR(S) : Richard A. Brisk et al It is certified that error appears in the above-identified patent and that said Letters Patent are hereby corrected as shown below:

Column 3, line 29, "multi-computers" should read --mini-computers--.

Column 9, line 16, "it possible to" should read --it proceeds to--.
Column 11, line 25, "than" should read --then--.
Column 12, line 40, "than" should read --then--.
Column 13, line 42, "following" should read --followed--.
Column 23, line 1, "syste" should read --system--.
Column 24, line 23, "selctively" should read --selectively--.

Signed and Sealed this

Fifteenth Day of May 1979

[SEAL]

Attest:

RUTH C. MASON
Attesting Officer

DONALD W. BANNER
Commissioner of Patents and Trademarks